United States Patent
Ishihara et al.

(10) Patent No.: US 9,676,657 B2
(45) Date of Patent: Jun. 13, 2017

(54) METHOD FOR PRODUCING GLASS PARTICULATE DEPOSIT AND METHOD FOR PRODUCING GLASS PREFORM

(71) Applicant: SUMITOMO ELECTRIC INDUSTRIES, LTD., Osaka-shi, Osaka (JP)

(72) Inventors: Tomohiro Ishihara, Yokohama (JP); Takashi Yamazaki, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/537,004

(22) Filed: Nov. 10, 2014

(65) Prior Publication Data

US 2015/0128650 A1 May 14, 2015

(30) Foreign Application Priority Data

Nov. 13, 2013 (JP) ................................. 2013-235193

(51) Int. Cl.
*C03B 19/14* (2006.01)
*C03B 37/014* (2006.01)

(52) U.S. Cl.
CPC ...... *C03B 37/0142* (2013.01); *C03B 2207/06* (2013.01); *C03B 2207/14* (2013.01); *C03B 2207/26* (2013.01); *C03B 2207/34* (2013.01); *C03B 2207/42* (2013.01); *C03B 2207/50* (2013.01); *C03B 2207/70* (2013.01); *Y02P 40/57* (2015.11)

(58) Field of Classification Search
CPC .................................................. C03B 2207/26
See application file for complete search history.

(56) References Cited

U.S. PATENT DOCUMENTS

| | | | |
|---|---|---|---|
| 5,922,100 A | 7/1999 | Cain et al. | |
| 6,588,230 B1 * | 7/2003 | Adler | C03B 19/1407 239/416 |
| 6,743,011 B2 | 6/2004 | Bakshi et al. | |
| 2002/0062659 A1 * | 5/2002 | Enomoto | C03B 19/106 65/17.4 |

(Continued)

FOREIGN PATENT DOCUMENTS

| | | |
|---|---|---|
| JP | H11-510778 A | 9/1999 |
| JP | T-2001-526174 | 12/2006 |
| WO | WO 99/32410 A1 | 7/1999 |

*Primary Examiner* — Cynthia Szewczyk
(74) *Attorney, Agent, or Firm* — Drinker Biddle & Reath LLP (57) ABSTRACT

A production method for a glass particulate deposit which includes a deposition step in which, at least two liquid source material ejecting ports 31a for a glass source material 23 jetting out from a burner 22 are provided per one burner 22, the area of at least one liquid source material port 31a is $2.25 \times 10^{-4}$ or less of the area of the flame forming part of the burner 22, the glass source material 23 is, in the form of a liquid thereof, supplied to each liquid material source port 31a, jetting gas ports 31b are arranged in such a manner that the inner periphery of the jetting gas port is positioned outside by 1.0 mm or less from the outer periphery of each liquid source material port 31a, and a gas is jetted out from each gas jetting port 31b.

14 Claims, 6 Drawing Sheets

(56) References Cited

U.S. PATENT DOCUMENTS

| | | | |
|---|---|---|---|
| 2003/0167796 A1* | 9/2003 | Hawtof | C01B 13/20 65/17.4 |
| 2004/0216494 A1* | 11/2004 | Kurotani | C03B 19/106 65/531 |
| 2005/0132749 A1* | 6/2005 | Otsuka | C03B 19/1423 65/17.4 |
| 2007/0062222 A1* | 3/2007 | Janka | C03B 19/1415 65/391 |
| 2010/0212357 A1* | 8/2010 | Yoshida | C03B 37/0142 65/22 |

* cited by examiner

METHOD FOR PRODUCING GLASS PARTICULATE DEPOSIT AND METHOD FOR PRODUCING GLASS PREFORM

This application claims priority from Japanese Patent Application No. 2013-235193, filed on Nov. 13, 2013, the entire contents of which are hereby incorporated by reference.

FIELD OF THE INVENTION

The present invention relates to a method for producing a glass particulate deposit by depositing glass particles on a starting rod according to an OVD process (outside vapor deposition process), a VAD process (vapor phase axial deposition process), an MMD process (multiburner multilayer deposition process) or the like, and to a method for producing a glass preform by heating and vitrifying the glass particulate deposit.

DESCRIPTION OF THE RELATED ART

Heretofore, as a method for producing a glass preform, there is known a production method including a deposition step of forming a glass particulate deposit according to an OVD process, a VAD process or the like, and a vitrification step of forming a transparent glass preform by heating the glass particulate deposit.

For example, there is disclosed a precision burner for oxidizing a silicon-containing compound not containing a halide, such as octamethylcyclotetrasiloxane (OMCTS) or the like, which is used in forming a glass preform in JP-T-H 11-510778. There is disclosed a linear burner for hydrolysis or oxidation of $SiCl_4$ or $GeCl_4$ or a silicon-containing compound such as OMCTS or the like in U.S. Pat. No. 6,743,011.

However, the burners disclosed in JP-T 11-510778 and U.S. Pat. No. 6,743,011 have a problem to be solved in that the glass source material yield must be increased in producing the glass particulate deposit by depositing the glass particles formed in the flame generated by the burner, on the starting rod.

SUMMARY OF THE INVENTION

The present invention provides a production method for a glass particulate deposit as an embodiment capable of solving the above-mentioned problems. The production method for glass particulate deposit includes a deposition step where a starting rod and a burner for production of glass particles are installed in a reactor, a glass source material is introduced into the burner, the glass source material is subjected to flame thermal decomposition in the flame formed by the burner to thereby form glass particles, and the formed glass particles are deposited on the starting rod to produce a glass particulate deposit. In the deposition step of the production method, at least two ejecting ports are provided per one burner for ejecting the glass source material from the burner, the area of at least one ejecting port of those ejecting ports is $2.25 \times 10^{-4}$ or less of the area of the flame forming part of the burner, the glass source material is, in the form of a liquid thereof, supplied to each of the ejecting ports, gas jetting ports are arranged in such a manner that the inner periphery of the gas jetting port is positioned outside by 1.0 mm or less from the outer periphery of the liquid material ejecting port, and a gas is jetted out from the gas jetting port.

The present invention also provides a production method for a glass preform as another embodiment capable of solving the above-mentioned problems. The production method for a glass preform includes a vitrification step where a glass particulate deposit is produced according to the above-mentioned production method for a glass particulate deposit, and the thus-produced glass particulate deposit is heated to give a transparent glass preform.

According to the production method for a glass particulate deposit and the production method for a glass preform of the present invention, it is possible to increase the glass source material yield for the produced glass particulate deposit.

DETAILED DESCRIPTION OF EXEMPLARY EMBODIMENTS

First described are the contents of the embodiments of the present invention in turn. One example of an embodiment of the production method for a glass particulate deposit of the present invention has any of the characteristic features (1) to (23) mentioned below.

(1) A production method for a glass particulate deposit which includes a deposition step where a starting rod and a burner for production of glass particles are installed in a reactor, a glass source material is introduced into the burner, the glass source material is subjected to flame thermal decomposition in the flame formed by the burner to thereby form glass particles, and the formed glass particles are deposited on the starting rod to produce a glass particulate deposit. In the deposition step of the production method, at least two ejecting ports are provided per one burner for ejecting the glass source material jetting out from the burner, the area of at least one ejecting port of those ejecting ports is $2.25 \times 10^{-4}$ or less of the area of the flame forming part of the burner, the glass source material is, in the form of a liquid thereof, supplied to each of the ejecting ports, gas jetting ports are arranged in such a manner that the inner periphery of the gas jetting port is positioned outside by 1.0 mm or less from the outer periphery of the liquid material ejecting port, and a gas is jetted out from the gas jetting port.

According to the production method for a glass particulate deposit having the characteristic feature, it is possible to reduce the input amount of the glass source material to be jetted out from each ejecting port of the burner for production of glass particles, and it is also possible to promote the glass source material reaction and to increase the glass source material yield for the glass particulate deposit. In addition, since the glass source material is supplied to the system in the form of a liquid thereof, the method does not require any expensive processing apparatus for vaporizing the glass source material having a high boiling point, and therefore it is possible to reduce the production cost for the glass particulate deposit. Further, since the gas is jetted out from the site very near to the outer side of the liquid source material jetting port, the glass source material can be efficiently atomized.

(2) Preferably, in the deposition step in the production method for a glass particulate deposit having the above-mentioned characteristic feature (1), five or more liquid material ejecting ports are provided per one burner.

According to the production method for a glass particulate deposit having the characteristic feature, it is possible to further promote the glass source material reaction and to further improve the glass source material yield.

(3) Also preferably, in the deposition step in the production method for a glass particulate deposit having the above-mentioned characteristic feature (1) or (2), the area of at least one ejecting port is $1.00 \times 10^{-4}$ or less of the area of the flame forming part of the burner.

According to the production method for a glass particulate deposit having the characteristic feature, it is possible to expand the glass source material in the flame and therefore the glass source material reaction can be thereby promoted.

(4) Also preferably, in the deposition step in the production method for a glass particulate deposit having the above-mentioned characteristic feature (1) or (2), the area of at least one ejecting port is $2.50 \times 10^{-5}$ or less of the area of the flame forming part.

(5) Also preferably, in the deposition step in the production method for a glass particulate deposit having the above-mentioned characteristic feature (1) or (2), the area of at least one ejecting port is $4.00 \times 10^{-6}$ or less of the area of the flame forming part.

(6) Also preferably, in the deposition step in the production method for a glass particulate deposit having any of the above-mentioned characteristic features (1) to (5), a gas containing oxygen gas is jetted out through each gas jetting port to thereby atomize the glass source material jetting out through each ejecting port.

According to the production method for a glass particulate deposit having the characteristic feature, it is possible to jet out the gas that contains oxygen gas through the site very near to the outer side of the liquid source material ejecting port, and therefore it is possible to promote the oxidation reaction of the glass source material.

(7) Also preferably, in the deposition step in the production method for a glass particulate deposit having the above-mentioned characteristic feature (6), the gas is jetted out at a flow rate of 855 m/s or more through each gas jetting port to thereby atomize the glass source material jetting out through each liquid material ejecting port.

According to the production method for a glass particulate deposit having the characteristic feature, it is possible to reduce the mist droplet size of the glass source material and therefore to increase the vaporization efficiency of the atomized glass source material.

(8) Also preferably, in the deposition step in the production method for a glass particulate deposit having the above-mentioned characteristic feature (6), the gas is jetted out at a flow rate of 1283 m/s or more through each gas jetting port to thereby atomize the glass source material jetting out through each liquid material ejecting port.

(9) Also preferably, in the deposition step in the production method for a glass particulate deposit having the above-mentioned characteristic feature (7) or (8), the number of the oxygen molecules contained in the gas jetted out through each gas jetting port is not less than the number of the Si atoms contained in the glass source material jetting out through each liquid material ejecting port.

According to the production method for a glass particulate deposit having the characteristic feature, it is possible to increase the efficiency of oxidation of the glass source material to $SiO_2$.

(10) Also preferably, in the deposition step in the production method for a glass particulate deposit having the above-mentioned characteristic feature (7) or (8), the number of the oxygen molecules contained in the gas jetted out through each gas jetting port is at least 1.5 times the number of the Si atoms contained in the glass source material jetting out through each liquid material ejecting port.

(11) Also preferably, in the deposition step in the production method for a glass particulate deposit having the any of above-mentioned characteristic features (1) to (10), the glass source material to be supplied to the burner is siloxane.

(12) Also preferably, in the deposition step in the production method for a glass particulate deposit having the any of above-mentioned characteristic features (1) to (10), the glass source material to be supplied to the burner is octamethyl-cyclotetrasiloxane (OMCTS).

One example of an embodiment of the production method for a glass preform of the present invention has the characteristic feature (13) or (14) mentioned below.

(13) A production method for a glass preform which includes:

a vitrification step where a glass particulate deposit is produced according to any of the above-mentioned production methods (1) to (12) for a glass particulate deposit, and the thus-produced glass particulate deposit is heated to give a transparent glass preform.

According to this constitution, there can be provided a production method for a glass preform capable of improving the glass source material yield for the glass particulate deposit.

(14) Preferably, in the production method for a glass preform of the above (13), the deposition of the glass particles on the starting rod in the deposition step is implemented according to any of an OVD process, a VAD process or an MMD process.

DETAILED DESCRIPTION OF EMBODIMENTS OF THE INVENTION

Examples of the embodiments of the production method for a glass particulate deposit and the production method for a glass preform of the present invention are described in detail with reference to FIG. 1 to FIG. 5. In the following description, there are exemplified cases of using an OVD (outside vapor deposition) process for the production method for a glass particulate deposit. However, the process employable for the production method for a glass particulate deposit in the embodiments to be described below is not limited to such an OVD process. Herein employable are any other processes of, for example, a VAD (vapor phase axial deposition) process, an MMD (multiburner multilayer deposition) process or the like in which glass can be deposited through flame thermal decomposition of a glass source material, like in an OVD process.

Figure 1:
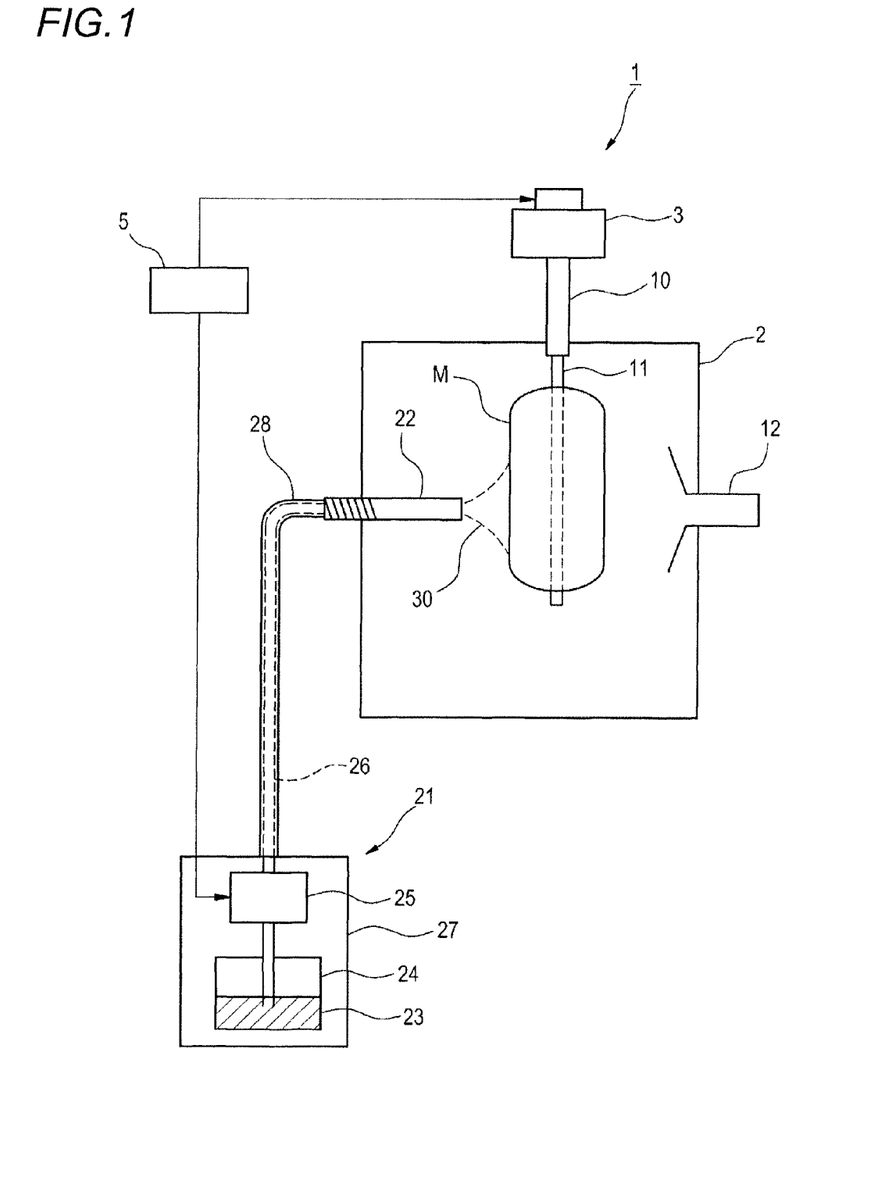
FIG. 1 is a configuration view showing a production apparatus for implementing the production method for a glass particulate deposit of one example of an embodiment of the present invention.

FIG. 1 is a configuration view of a production apparatus 1 for implementing the production method for a glass particulate deposit of one embodiment of the present invention. The production apparatus 1 comprises a reactor 2, an elevating revolver 3, a source material supplier 21, a burner 22 for formation of glass particles, and a controller 5 for controlling the movement of each member.

The reactor 2 is a container in which a glass particulate deposit M is formed, and this has an exhaust pipe 12 formed through the side wall thereof.

The elevating revolver 3 is a device for lifting and lowering and rotating the glass particulate deposit M via a supporting rod 10 and a starting rod 11. The elevating revolver 3 controls the movement of the supporting rod 10 based on the control signal sent from the controller 5. The elevating revolver 3 moves up and down the glass particulate deposit M while rotating it.

The supporting rod 10 is arranged to run through the through-hole formed in the top wall of the reactor 2, and the starting rod 11 is fitted onto one end thereof (lower end in FIG. 1) arranged in the reactor 2. The other end of the supporting rod 10 (upper end in FIG. 1) is held by the elevating revolver 3.

The starting rod 11 is a rod on which glass particles are deposited, and is fitted onto the supporting rod 10.

The exhaust pipe 12 is a pipe through which the glass particles not having adhered to the starting rod 11 and to the glass particulate deposit M are discharged out of the reactor 2.

A liquid source material 23 is supplied to the burner 22 via the source material supplier 21. In FIG. 1, a gas supplier for supplying a flame forming gas is omitted.

The source material supplier 21 comprises a source material container 24 for storing the liquid source material 23 therein, a pump for sending the liquid source material 23, a supply pipe 26 for leading the liquid source material 23 toward the burner, and a temperature controlling booth 27 for temperature control including the source material container 24, the pump 25 and a part of the supply pipe 26.

The pump 25 is a device for supplying the liquid source material 23 to be ejected out from the burner 22, to the burner 22 via the supply pipe 26. The pump 25 controls the supply amount of the liquid source material 23 to be supplied to the burner 22 based on the control signal sent from the controller 5.

The supply pipe 26 is a pipe for leading the liquid source material 23 to the burner 22. For keeping the supply pipe 26 at a high temperature, it is desirable that a tape heater 28 that is a heat generator is wound around the outer periphery of the supply pipe 26 and a part of the outer periphery of the burner 22. When electrified, the tape heater 28 heats the supply pipe 26 and the burner 22, whereby the temperature of the liquid source material 23 ejected out through the burner 22 can be elevated up to a temperature suitable for the source material reaction. For example, when the liquid source material 23 is an octamethylcyclotetrasiloxane (OMCTS) liquid, then it may be heated up to a temperature of from 30 to 170° C.

Through the burner 22, the liquid source material 23 is vaporized in the formed flame, and further the vaporized source material is oxidized to give glass particles 30, and the thus-formed glass particles 30 are jetted out onto the starting rod 11 and deposited thereon.

The controller 5 controls each movement of the elevating revolver 3, the source material supplier 21, etc. The controller 5 sends a control signal to control the elevating and lowering speed and the rotating speed of the glass particulate deposit M, to the elevating revolver 3. Further, the controller 5 sends a control signal to control the flow rate of the liquid source material 23 to be ejected from the burner 22 to the pump 25 of the source material supplier 21.

As the burner 22, for example, employable here is one having a cylindrical multinozzle structure or one having a linear multinozzle structure, for jetting out the glass source material and the flame forming gas therethrough.

Figure 2A:
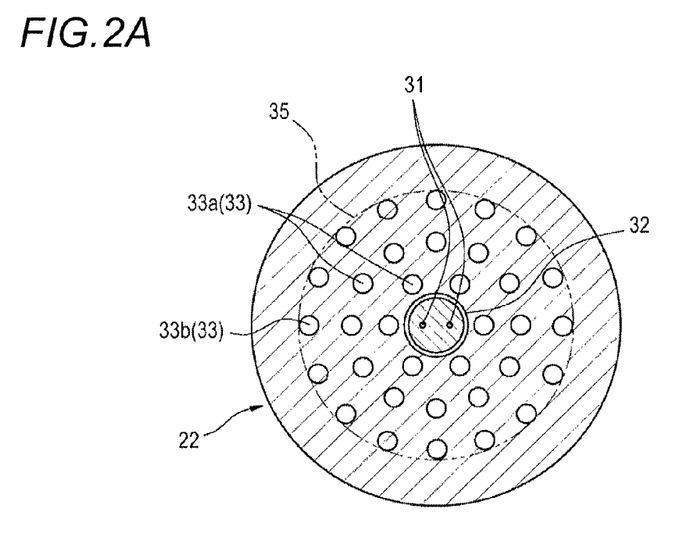
FIG. 2A is a plan view of one example of a burner for producing glass particles in the production apparatus shown in FIG. 1, as seen from the burner top side.

FIG. 2A is a plan view the burner 22, one example of a burner having a multinozzle structure, as seen from the burner top side.

The burner 22 shown in FIG. 2A has a source material port 31 for jetting out the liquid source material 23 therethrough, at the center of the burner top. The source material port 31 includes a liquid source material port for jetting out the liquid source material 23 (one example of the glass source material ejecting port) 31a and a jetting gas port (one example of the gas jetting port) 31b. The jetting gas port 31b is so arranged that the inner periphery thereof is positioned outside by 1.0 mm or less from the outer periphery of the liquid source material ejecting port 31a. Via the source material port 31, the gas jetted out through the jetting gas port 31b is applied to the liquid source material jetting out through the liquid source material port 31a, and the liquid source material is thereby atomized. A seal gas port 32 is provided around the source material ports 31. Further around the seal gas port 32, multiple combustion gas ports 33 each for jetting out a combustion gas therethrough are arranged concentrically.

From the liquid source material port 31a of the source material port 31 at the center, for example, a siloxane liquid such as typically OMCTS or the like as the liquid source material 23 is jetted out. From the jetting gas port 31b of the source material port 31 at the center, for example, a gas of nitrogen ($N_2$), oxygen ($O_2$), argon (Ar) or the like is jetted out singly or as mixed. From the seal gas port 32, for example, an inert gas of nitrogen ($N_2$) or argon (Ar) is supplied as a seal gas. From the combustion gas port 33, for example, a combustible gas of hydrogen ($H_2$) is jetted out through the port 33a on the inner side, while a co-combustion gas of oxygen ($O_2$) is jetted out through the port 33b on the outer side.

Figure 2B:
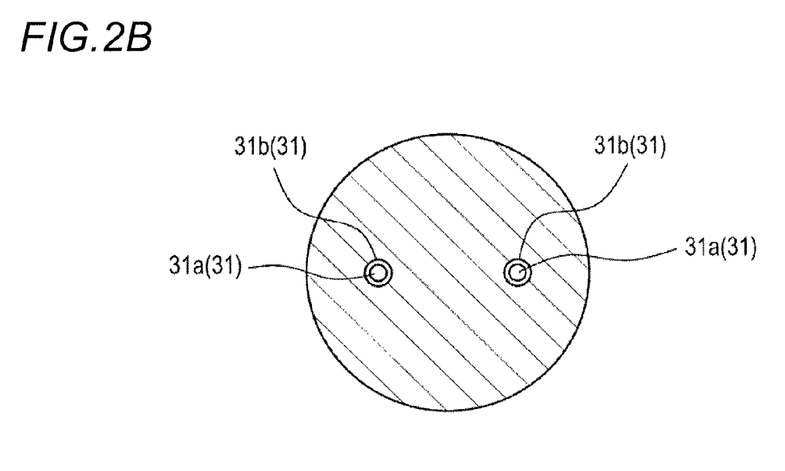
FIG. 2B is an enlarged view near the source material port of the burner top in the plan view of FIG. 2A.

As shown in FIG. 2B, in this embodiment, two source material ports 31 are provided at the center of the burner 22. To the liquid source material port 31a of each source material port 31, siloxane is supplied in the form of a liquid thereof, and the siloxane liquid is jetted out through the liquid source material port 31a. Two or more such source material ports 31 are provided here, and consequently, the amount of the source material to be jetted out through one liquid source material port 31a can be reduced, and therefore the efficiency of chemical change of the source material to $SiO_2$ can be thereby increased. In particular, in case where the source material liquid is ejected into the burner flame while kept in an atomized state thereof, the mist droplet size can be reduced and therefore the vaporization efficiency of the source material liquid can be thereby increased. When the number of the ejecting ports for the glass source material (liquid source material ports 31a) is larger, the effect could be higher, and when the number is 5 or more, then the vaporization efficiency could also be enhanced. However, when the number is too large, then the cost of the burner would increase.

In FIG. 2A, the area of the flame forming part 35 of the burner 22 is shown as surrounded by the dashed line. The flame forming part 35 extends to the outside of the periphery of the outermost ports 33b of the multiple ports 33b that are arranged concentrically in the burner top of the burner 22. In this embodiment, the area of at least one liquid source material port 31a of the liquid source material ports 31a (but all such ports in this embodiment) is $2.25 \times 10^{-4}$ or less of the area of the flame forming part 35. When the area of even one of those liquid source material ports 31a is larger than $2.25 \times 10^{-4}$ of the area of the flame forming part 35, then the glass source material yield could not be increased in producing the glass particulate deposit M.

More preferably, the area of each liquid source material port 31a is not more than $1.00 \times 10^{-4}$ of the area of the flame forming part 35. More preferably, the area of each liquid source material port 31a is not more than $2.50 \times 10^{-5}$ of the area of the flame forming part 35, and even more preferably, not more than $4.00 \times 10^{-6}$ thereof. The lower limit of the area of one liquid source material port 31a is defined by the threshold limit value of the processing accuracy.

Figure 3:
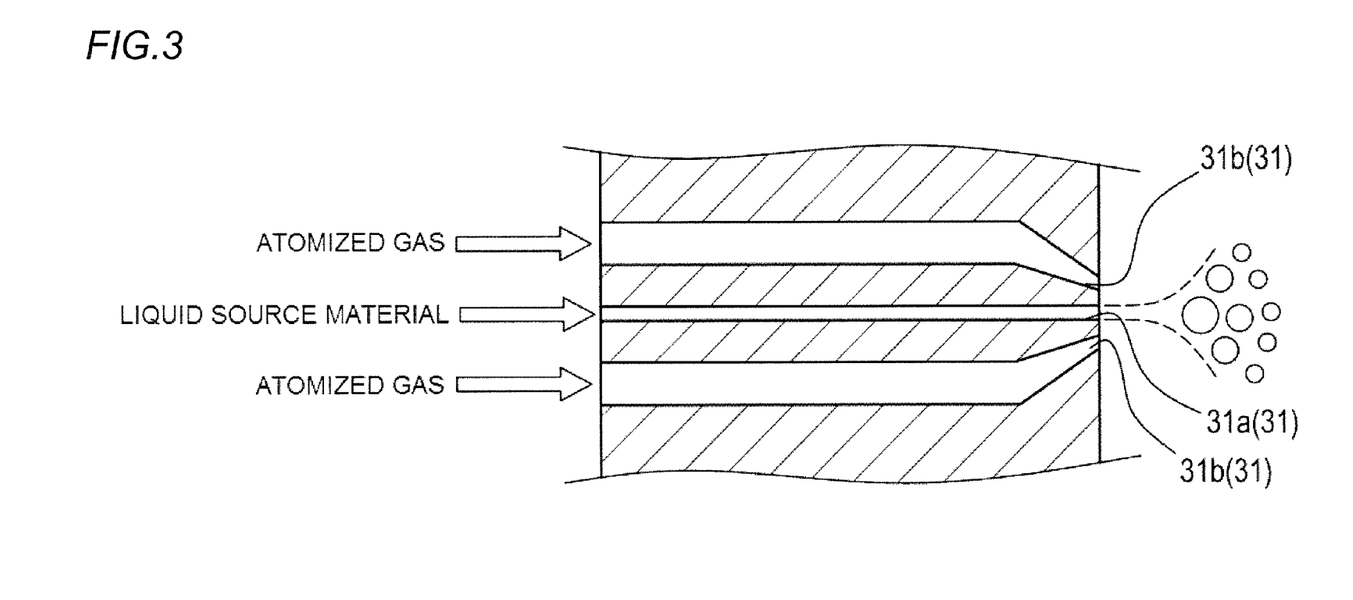
FIG. 3 is an enlarged view of a vertical cross-sectional view of the burner, showing a situation where a liquid source material is supplied to the source material port shown in FIG. 2B and while a gas is supplied from the outside thereof.

As shown in FIG. 3, the source material port 31 has the liquid source material port 31a and the jetting gas port 31b, and the jetting gas port 31b is so designed that the tip thereof is inclined toward the liquid source material port 31a adjacent to the inner periphery thereof. Accordingly, the gas jetting direction is focused to the center axis of the liquid source material port 31a so that the jetting gas could collide against the siloxane liquid jetting out through the liquid source material port 31a. The siloxane liquid jetting out through the liquid source material port 31a is atomized owing to the collision and may expand nearly uniformly in the radius direction of the burner 22 in the flame.

In this embodiment, from the jetting gas port 31b provided on the outer peripheral side of the source material port 31, a gas containing oxygen gas is jetted out at a flow rate of 855 m/sec or more, and is made to collide against the siloxane liquid jetting out through each liquid source material port 31a, and accordingly, the atomized liquid size of siloxane can be thereby reduced. More preferably, the gas is jetted out through the jetting gas port 31b so that its flow rate could be 1283 m/sec or more.

Further, in this embodiment, the number of the $O_2$ molecules contained in the gas jetted out through the jetting gas port 31b provided on the outer peripheral side of the source material port 31 is defined to be not less than the number of the Si atoms contained in the liquid source material 23 jetting out through each liquid source material port 31a. In that manner, the number of the $O_2$ molecules contained in the gas is defined to be not less than the number of the Si atoms contained in the liquid source material 23, and accordingly, the efficiency of oxidizing the liquid source material 23 to give $SiO_2$ can be thereby increased. More preferably, the number of the $O_2$ molecules contained in the gas jetted out through the jetting gas port 31b is defined to be at least 1.5 times the number of the Si atoms contained in the liquid source material 23 jetting out through each liquid source material port 31a.

Accordingly, the siloxane liquid is jetted out into the oxyhydrogen flame generated by the flame forming gas in the burner 22, then atomized owing to collision against gas, and vaporized by the heat of the oxyhydrogen flame, and the thus-vaporized source material reacts with the oxygen in the flame, and forms silicon oxide ($SiO_2$) particles as the glass particles 30 through thermal oxidation decomposition. The thus-formed glass particles 30 are deposited on the starting rod 11 to give the glass particulate deposit M having a predetermined outer diameter.

Next described is a process of the production method for a glass particulate deposit and a glass preform.

[Deposition Step]

Glass particles are deposited according to an OVA process (outside vapor deposition process) to produce the glass particulate deposit M. First, as shown in FIG. 1, the supporting rod 10 is fitted onto the elevating revolver 3, and the starting rod 11 is fitted onto the lower end of the supporting rod 10, and in that condition, the starting rod 11 and a part of the supporting rod 10 are housed in the reactor 2.

Subsequently, via the pump 25, the liquid source material 23 is supplied to the burner 22 while the supply amount thereof is controlled on the basis of the control signal sent from the controller 5.

The liquid source material 23, gas and oxyhydrogen gas (flame forming gas) are supplied to the burner 22, and the atomized liquid source material 23 is vaporized in the oxyhydrogen flame and thereafter oxidized to give glass particles 30.

With that, the burner 22 further acts to continuously deposit the glass particles 30 formed in the flame, onto the starting rod 11 that rotates and moves up and down.

The elevating revolver 3 acts to move up and down and rotate the starting rod 11 and the glass particulate deposit M deposited on the starting rod 11, based on the control signal from the controller 5.

[Vitrification Step]

Next, the resultant glass particulate deposit M is heated in a mixed atmosphere of an inert gas and a chlorine gas at 1100° C., and then further heated in a He atmosphere at 1550° C. to give a transparent glass preform. The glass preform production is repeated.

As described above, in the deposition step in this embodiment, two liquid source material ports 31a are provided per one burner 22, which are ejecting ports for the glass source material (liquid source material 23), and in addition, the area of each one liquid source material port 31a of those two liquid source material ports 31a is $2.25 \times 10^{-4}$ or less of the area of the flame forming part of the burner. In addition, the glass source material is supplied to the liquid source material port 31a in the form of a liquid thereof, and the jetting gas ports 31b are arranged in such a manner that the inner periphery thereof is positioned outside by 1.0 mm or less from the outer periphery of the liquid source material port 31a, and the gas is jetted out through the jetting gas port 31b. Two or more liquid source material ports 31a are provided here, and consequently, the amount of the liquid source material 23 to be jetted out through each liquid source material port 31a can be reduced, and the glass source material yield in chemical reaction of the liquid source material 23 into $SiO_2$ can be therefore increased. In particular, when the liquid source material 23 is, after atomized, ejected into the flame formed by the burner 22, the atomized droplet diameter of the liquid source material 23 can be reduced, and therefore the efficiency in vaporization of the atomized liquid source material 23 by the heat of the burner flame can be thereby increased.

In addition, in this embodiment, the area of one liquid source material port 31a is $1.00 \times 10^{-4}$ or less of the area of the flame forming part 35, more preferably $2.50 \times 10^{-6}$ or less thereof, even more preferably $4.00 \times 10^{-6}$ or less thereof. Accordingly, the liquid source material 23 can readily expand in the outer peripheral direction of the flame from the center of the flame owing to the free jet flow thereof, and therefore the stirring of the source material and oxygen is promoted and the oxidation reaction of the source material is promoted further more. Moreover, in case where the liquid source material 23 is, after atomized, ejected into the flame formed by the burner 22, the above-mentioned constitution can exhibit another effect of reducing the atomized droplet diameter of the liquid source material 23, and therefore the vaporization efficiency of the liquid source material 23 can be increased and the source material reaction efficiency can be thereby increased.

In addition, the standard boiling point of OMCTS is 175° C. and is extremely high, and therefore, for supplying OMCTS into the burner 22, after vaporized to be in a gaseous state, an expensive processing device must be additionally prepared. Consequently, in this embodiment, OMCTS in the form of a liquid is supplied to the burner 22, and the OMCTS liquid is atomized by spraying the gas onto the circumference of the OMCTS liquid jetting out through the burner 22 (outside by 1.0 mm or less from the outer periphery of the liquid source material port 31a). According to this constitution, the apparatus does not require any expensive processing device for vaporizing OMCTS that is a glass source material having a high boiling point, and the production cost for the glass particulate deposit M can be thereby reduced.

In addition, in this embodiment, the gas is jetted out at a flow rate of 855 m/sec or more through the jetting gas port 31b in the vicinity of the outer periphery of each liquid source material port 31a to thereby atomize the liquid source material 23 jetting out from each liquid source material port 31a. Accordingly, the atomized droplet diameter of the liquid source material 23 can be reduced, and the vaporization efficiency of the mist of the liquid source material 23 can be thereby increased.

Further, when the gas is jetted out at a flow rate of 1283 m/sec or more through the jetting gas port 31b in the vicinity of the outer periphery of each liquid source material port 31a, then the above-mentioned effect can be increased still more.

In this embodiment, the number of oxygen molecules contained in the gas jetted out from the jetting gas port 31b in the vicinity of the outer periphery of each liquid source material port 31a is not less than the number of the Si atoms contained in the liquid source material 23 jetting out through each liquid source material port 31a. Accordingly, the efficiency of oxidation of the liquid source material 23 into $SiO_2$ can be increased. In addition, when the number of the oxygen molecules contained in the gas jetted out through the jetting gas port 31b from the jetting gas port 31b in the vicinity of the outer periphery of each liquid source material port 31a is at least 1.5 times the number of the Si atoms contained in the liquid source material 23 jetting out through each liquid source material port 31a, then the above-mentioned effect can be increased further more.

In this embodiment, as the liquid source material 23, a siloxane that is a halogen-free source material is used, and preferably an OMCTS liquid is used. $SiCl_4$ that has heretofore been used as a glass source material forms $SiO_2$ glass particles according to the following formula (1).

$$SiCl_4+2H_2O\rightarrow SiO_2+4HCl \qquad \text{Formula (1)}$$

In this case, HCl (hydrochloric acid) having a bad influence on the environment is formed as a side product, and therefore, the process requires a treatment device for detoxifying hydrochloric acid, or that is, the running cost in production of the glass preform according to the process is extremely high.

On the other hand, like in this embodiment, when a siloxane liquid such as typically OMCTS or the like is used, $SiO_2$ glass particles are formed according to the following formula (2).

$$[SiO(CH_3)_2]_4+16O_2\rightarrow 4SiO_2+8CO_2+12H_2O \qquad \text{Formula (2)}$$

As in the above, when a siloxane, more preferably OMCTS is used as the glass source material to be supplied to the burner, then any harmful substance such as hydrochloric acid is not discharged. Consequently, the process does not require any treatment device for removing or detoxifying such a harmful substance, and the production cost for the glass preform can be therefore reduced.

Figure 4A:
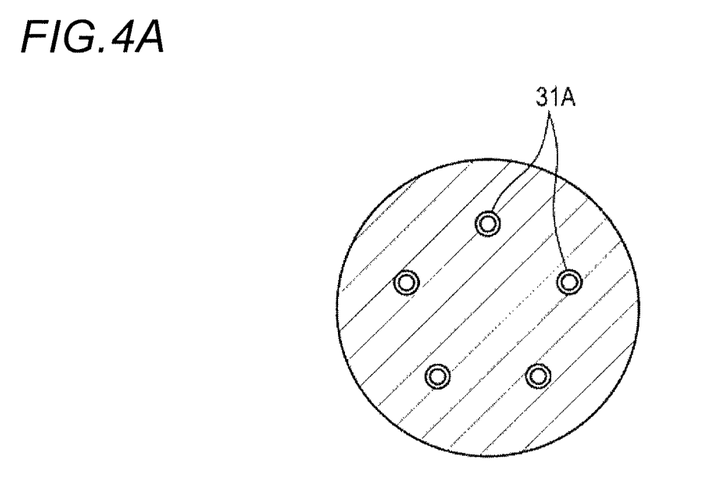
FIG. 4A is an enlarged view of a burner top, showing a modification of the source material ports formed in the burner provided in the production apparatus shown in FIG. 1.
Figure 4B:
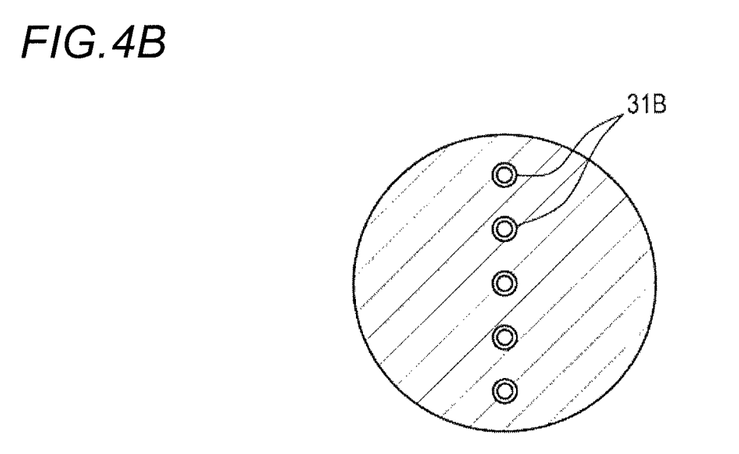
FIG. 4B is an enlarged view of a burner top, showing another modification of the source material ports formed in the burner provided in the production apparatus shown in FIG. 1.
Figure 4C:
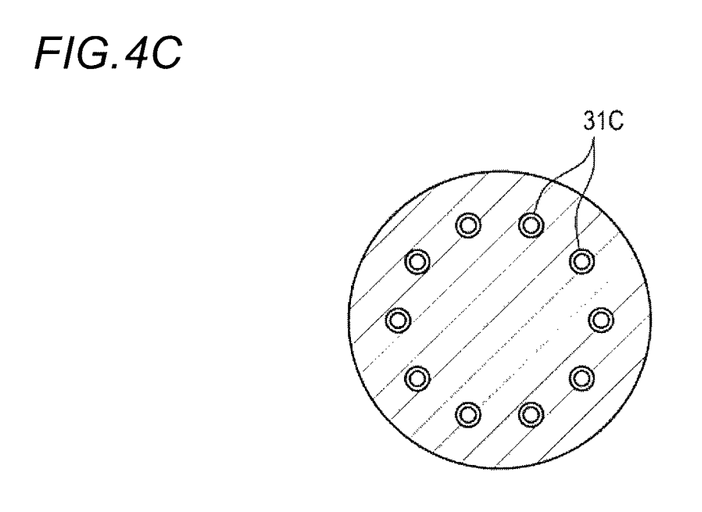
FIG. 4C is an enlarged view of a burner top, showing still another modification of the source material ports formed in the burner provided in the production apparatus shown in FIG. 1.

The above-mentioned embodiment is so designed that two source material ports 31 each having the liquid source material port 31a and the jetting gas port 31b are provided in the center part of the burner 22; however, the present invention is not limited to this example. For example, as shown in FIG. 4A, here may be employed a configuration where five source material ports 31A are provided concentrically in the center part of the burner. As shown in FIG. 4B, another configuration may be employed here where five source material ports 31B are provided in line. Further, as shown in FIG. 4C, still another configuration may be employed here where ten source material ports 31C are provided concentrically in the center part of the burner.

As in the above, providing 5 or more source material ports 31A, 31B and 31C per one burner 22 can further increase the glass source material yield for the glass particulate deposit M to be produced.

In this embodiment, the columnar burner 22 is used, to which, however, the present invention is not limited. For example, as in FIG. 5, a linear burner 122 may also be employed here.

Figure 5:
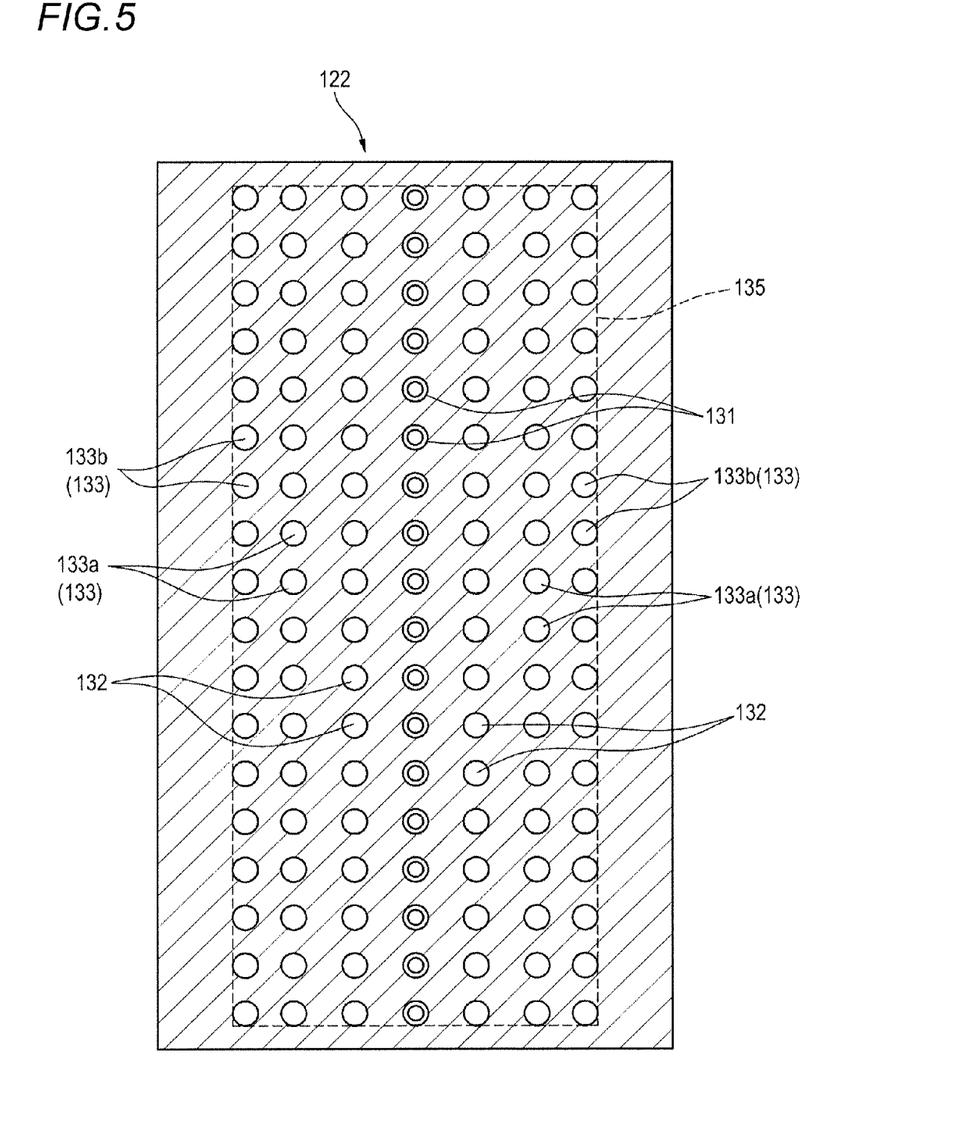
FIG. 5 is a plan view of the burner top of another example of the burner provided in the production apparatus shown in FIG. 1.

The linear burner 122 is so designed that, in the center part of the widthwise direction of the burner 122, multiple source material ports 131 are arranged in line in the lengthwise direction of the burner 122. The configuration of the source material port 131 is the same as that of the above-mentioned source material port 31. On both sides of the source material ports 131 aligned in line, multiple seal gas ports 132 are arranged. Further, on the outer side of the seal gas ports 132, multiple combustion bas ports 133 are arranged in two lines. Like in the above-mentioned embodiment, from the liquid source material port (one example of the ejection port of glass source material) in the source material port 131 positioned in the center, for example, a siloxane liquid such as typically OMCTS is jetted out as the liquid source material 23. Around the liquid source material port, there exist the jetting gas port, and for example, nitrogen ($N_2$), oxygen ($O_2$), argon (Ar) or the like gas is jetted out singly or as combined. From the seal gas port 132, for example, nitrogen ($N_2$) or argon (Ar) gas is supplied as a seal gas. From the inside ports 133a of the combustion gas ports 133 aligned in two lines, a combustible gas, hydrogen ($H_2$) is jetted out, and from the outside ports 133b, a co-combustion gas, oxygen ($O_2$) is jetted out.

In FIG. 5, the area surrounded by the dashed line is a flame forming part 135 in the burner 122. The area of the flame forming part 135 extends to the outer side of the ports 133b arranged on both ends. Like in the above-mentioned embodiment, the linear burner 122 is also so designed that the area of the liquid source material port of any one source material port 131 of all the source material ports 131 is defined to be $2.25\times10^{-4}$ or less of the area of the flame forming part 135.

More preferably, the area of the liquid source material port of each source material port 131 is defined to be $1.00\times10^{-4}$ or less of the area of the flame forming part 135. Even more preferably, the area of the liquid source material port of each source material port 131 is defined to be $2.50\times10^{-5}$ or less, still more preferably $4.00\times10^{-6}$ or less of the area of the flame forming part 135.

According to the linear burner 122 shown in FIG. 5, like in the above-mentioned embodiment, the input amount of the liquid source material 23 to jet out from each source material port 131 can be reduced, and the glass source material yield in chemical reaction of the liquid source material 23 to give $SiO_2$ can be thereby improved. In particular, in ejecting the liquid source material 23, after atomized, into the flame formed by the linear burner 122, the mist droplet diameter of the liquid source material 23 can be reduced, and therefore the efficiency in vaporizing the atomized liquid source material 23 by the heat of the burner flame can be thereby increased.

In the above-mentioned embodiment, OMCTS is used as one example of a siloxane liquid. Not limited to the case, any other siloxane such as DMCPS or the like can realize the same effects as in the above-mentioned embodiments.

In addition, still other source materials than siloxane, such as $SiCl_4$ can also realize the same effect of increasing the glass source material yield.

EXAMPLES

Using the production apparatus shown in FIG. 1 and according to an OVD process, glass particles were deposited, or that is, a glass particulate deposit M was produced [deposition step]. The resulting glass particulate deposit M was heated in a mixed atmosphere of an inert gas and a chlorine gas at 1100° C., and then heated in a He atmosphere at 1550° C. for vitrification [vitrification step].

A pure quartz glass rod having a diameter of 36 mm and a length of 400 mm was used as the starting rod. An OMCTS liquid was supplied to all the liquid source material ports of the burner in such a manner that the total amount of the liquid could be 16.5 g/min. In case where one burner has five liquid source material ports, the Si atom flow rate per one port is 0.044 mol/min. As the flame forming gas, $H_2$ (flow rate: 20 to 70 SLM) and $O_2$ (flow rate: 30 to 70 SLM) were supplied; and as the burner seal gas, Ar (flow rate: 1 to 85 SLM) was supplied.

In the deposition step, the number X of the source material ports per one burner, the ratio Y of the area of one liquid source material port to the area of the flame forming part, the flow rate Z (mol/min) of the $O_2$ molecules in the gas jetting out from around the outer periphery of each liquid source material port (jetting gas port), and the flow rate W (m/s) of the gas jetting out from each jetting gas port were varied suitably, and glass particles were deposited on the starting rod under different conditions. The source material yield A (%) of the formed glass particulate deposit and the equipment cost in each Example were evaluated relatively. The area of the flame forming part is defined to be the area surrounded by the dashed line of the burner shown in FIG. 2A and FIG. 5. In each Example, the exit area of the multiple liquid source material ports and the multiple jetting gas ports arranged in the burner is the same among the multiple liquid source material ports in the burner and is the same among the multiple jetting gas ports therein. In each Example, the inner periphery of the jetting gas port is positioned as separated by 0.9 mm from the outer periphery of the liquid source material port. On the other hand, in Comparative Examples, the inner periphery of the jetting gas port is positioned as separated by 1.1 mm from the outer periphery of the liquid source material port. The source material yield A means the ratio by mass of the glass particles having actually deposited on the starting rod and the glass particulate deposit, relative to the $SiO_2$ mass in the case where the OMCTS liquid put into the burner changed 100% to quartz glass particles through chemical reaction. As the burner A, used was the multinozzle burner shown in FIG. 3; and as the burner B, used was the linear burner shown in FIG. 5.

The results are shown in Table 1.

TABLE 1

| | X (number) | Y | Z (mol/min) | W (m/s) | A (%) | Burner | Equipment Cost |
|---|---|---|---|---|---|---|---|
| Example 1 | 2 | 2.50E−05 | 0.027 | 513 | 50 | A | 1 |
| Example 2 | 5 | 2.50E−05 | 0.027 | 513 | 60 | A | 1 |
| Example 3 | 10 | 2.50E−05 | 0.027 | 513 | 70 | A | 1 |
| Example 4 | 50 | 2.50E−05 | 0.027 | 513 | 80 | B | 1 |
| Example 5 | 100 | 2.50E−05 | 0.027 | 513 | 90 | B | 1 |
| Example 6 | 5 | 2.25E−04 | 0.027 | 513 | 50 | A | 1 |
| Example 7 | 5 | 1.00E−04 | 0.027 | 513 | 55 | A | 1 |
| Example 8 | 5 | 4.00E−06 | 0.027 | 513 | 80 | A | 1 |
| Example 9 | 5 | 2.50E−05 | 0.000 | 513 | 50 | A | 1 |
| Example 10 | 5 | 2.50E−05 | 0.045 | 856 | 70 | A | 1 |
| Example 11 | 5 | 2.50E−05 | 0.067 | 1284 | 80 | A | 1 |
| Example 12 | 5 | 2.50E−05 | 0.089 | 1711 | 85 | A | 1 |
| Example 13 | 5 | 2.50E−05 | 0.027 | 152 | 50 | A | 1 |
| Example 14 | 5 | 2.50E−05 | 0.027 | 856 | 65 | A | 1 |
| Example 15 | 5 | 2.50E−05 | 0.027 | 2158 | 80 | A | 1 |
| Comparative Example 1 | 1 | 4.00E−04 | 0.027 | 513 | 20 | A | 1 |
| Comparative Example 2 | 1 | 4.00E−04 | 0.045 | 250 | 22 | A | 1 |
| Comparative Example 3 | 1 | 5.76E−04 | 0.045 | 211 | 16 | A | 1 |
| Comparative Example 4 | 1 | 4.00E−04 | 0.027 | 513 | — | A | 1.3 |

Example 1

Example 1, in which the number of the source material ports per one burner is 2, the ratio of the area of one liquid source material port to the area of the flame forming part is $2.50 \times 10^{-5}$, the flow rate of the $O_2$ molecules in the gas jetted out through each jetting gas port is 0.027 mol/min, and the flow rate of the gas jetted out through each jetting gas port is 513 m/s, gave a result that the source material yield is 50%.

Comparative Example 1

On the other hand, Comparative Example 1, in which the number of the source material port per one burner is one, the ratio of the area of the liquid source material port to the area of the flame forming part is larger than $2.50 \times 10^{-5}$, and is, for example, $4.00 \times 10^{-4}$, and the inner periphery of the jetting gas port is separated by 1.1 mm from the outer periphery of the liquid source material port, gave a result that the source material yield is only 20% even though the flow rate Z of the $O_2$ molecules in the gas jetted out through the jetting gas port and the flow rate W of the gas jetted out through the jetting gas port are the same as those in Example 1.

These results confirm that, when the number of the source material ports per one burner is 2 or more, the ratio of the area of the liquid source material port to the area of the flame forming part is less than $2.25 \times 10^{-4}$, and at least a part of the jetting gas ports are arranged inside by 1.0 mm or less from the outer periphery of the liquid source material port, then the source material yield is greatly increased.

Examples 2 to 5

In Examples 2 to 5, the number X of the source material ports per one burner was increased more than in Example 1. The number of the source material ports was 5 in Example 2, the number of the source material ports was 10 in Example 3, the number of the source material ports was 50 in Example 4, and the number of the source material ports in Example 5 was 100. In Examples 2 to 5, the ratio Y of the area of one liquid source material port to the area of the flame forming part, the flow rate Z of the $O_2$ molecules in the gas jetted out through each jetting gas port and the flow rate W of the gas jetted out through each jetting gas port were the same as in Example 1.

As a result, as shown in Table 1, it is confirmed that, with the increase in the number of the source material ports per one burner, the source material yield increased. In Examples 4 and 5, used was a linear burner such as that shown in FIG. 5.

Examples 6 to 8

In Examples 6 to 8, the ratio Y of the area of one liquid source material port to the area of the flame forming part was varied. In Example 6, the ratio in the burner used is $2.25 \times 10^{-4}$, in Example 7, the ratio is $1.00 \times 10^{-4}$, and in Example 8, the ratio is $4.00 \times 10^{-6}$. In Examples 6 to 8, the number X of the source material ports per one burner, the ratio Y of the area of one liquid source material port to the area of the flame forming part, the flow rate Z of the $O_2$ molecules in the gas jetted out through each jetting gas port and the flow rate W of the gas jetted out through each jetting gas port were the same as in Example 2.

As a result, as shown in Example 6 Table 1, it is confirmed that, when the ratio of the area of one liquid source material port to the area of the flame forming part is not more than $2.25 \times 10^{-4}$, then the source material yield was sufficiently improved as compared with that in Comparative Example 1. From the results of Examples 2 ad 6 to 8, it is confirmed that with the reduction in the ratio Y of the area of one liquid source material port to the area of the flame forming part, the source material yield is increased more.

Examples 9 to 12

In Examples 9 to 12, the flow rate Z of the $O_2$ molecules in the gas jetted out through each jetting gas port and the flow rate W of the gas jetted out through each jetting gas port were varied. In Example 9, the values are 0 mol/min and 513 m/s; in Example 10, the values are 0.045 mol/min and 856 m/s; in Example 11, the values are 0.067 mol/min and 1284 m/s; and in Example 12, the values are 0.089 mol/min and 1711 m/s. In Examples 9 to 12, the number X of the source material ports per one burner, and the ratio Y of the area of one liquid source material port to the area of the flame forming part were the same as in Example 2.

As a result, as shown in Table 1, it is confirmed that, with the increase in the flow rate Z of the $O_2$ molecules in the gas jetted out through each jetting gas port, the source material yield was sufficiently improved as compared with that in Comparative Example 1. Concretely, when the flow rate of the $O_2$ molecules in the gas (0.045 mol/min) was more than the flow rate of the Si atoms in OMCTS as jetted out as the liquid source material (0.044 mol/min) as in Example 10, then the source material yield was greatly improved. On the other hand, when the number of the $O_2$ molecules in the gas was not less than 1.5 times the number or the Si atoms in OMCTS as in Examples 11 and 12, then the source material yield was further more improved. From this, it is confirmed that the source material yield is improved more with the increase in the molecule flow rate Z. Example 9 demonstrates a case where the $O_2$ molecule flow rate is 0 mol/min. It is known that even though the flow rate W from each jetting gas port was the same as in Comparative Example 1, the source material yield was predominantly higher in Example 9. This confirms that, for increasing the source material yield, it is important that the number of the source material ports per one burner is 2 or more, the ratio of the area of the liquid source material port to the area of the flame forming part is $2.25 \times 10^{-4}$ or less, and the jetting gas port is positioned inside by 1.0 mm or less from the outer periphery of the liquid source material port.

Examples 13 to 15

In Examples 13 to 15, the flow rate W of the gas jetted out through the jetting gas port was varied. In Example 13, the flow rate was 152 m/s; in Example 14, the flow rate was 856 m/s; and in Example 15, the flow rate was 2158 m/s. In Examples 13 to 15, the number X of the source material ports per one burner, the ratio Y of the area of one liquid source material port to the area of the flame forming part, and the flow rate Z of the $O_2$ molecules in the gas jetted out through each jetting gas port were the same as in Example 2.

As a result, as shown in Table 1, it is confirmed that when the gas flow rate from each jetting gas port is not less than 152 m/s, then the source material yield was sufficiently improved as compared with that in Comparative Example 1. In addition, from the results in Examples 2, and 13 to 15, it is confirmed that the source material yield is increased more with the increase in the flow rate W.

Comparative Examples 2, 3

Comparative Examples 2 and 3 demonstrate other cases where the number of the source material port was one like in Comparative Example 1 but each parameter was varied therein. The above-mentioned Examples 9 to 15 gave results that, when the flow rate Z of the $O_2$ molecules in the gas jetted out through each jetting gas port is increased or when the gas flow rate W from each jetting gas port is increased, then the source material yield is increased. However, as shown in Comparative Examples 2 and 3 in Table 1, when the number of the source material port per one burner is 1, the ratio Y of the area of one liquid source material port to the area of the flame forming part is large and the inner periphery of the jetting gas port is greatly separated by more than 1.0 mm from the outer periphery of the liquid source material port, then the source material yield could not be improved so much like in Examples even though the parameter change would be somewhat effective.

Comparative Example 4

Comparative Example 4 demonstrates a case where the source material was supplied to the burner after vaporized. The case requires an expensive vaporizer (omitted in the drawing), and therefore, as compared with the other cases where the source material was supplied as a liquid thereof (Examples 1 to 15, Comparative Examples 1 to 3, it is known that the equipment cost increased by 1.3 times. In addition, when the vaporized source material is ejected from the liquid source material port and when a gas containing $O_2$ molecules in a ratio of 0.027 mol/min is introduced from the outer periphery of the port, then glass particles are formed around the burner and the glass particles are deposited on the burner, therefore providing a problem that the burner is clogged. Consequently, the source material yield is unmeasurable.

The invention claimed is:

1. A production method for a glass particulate deposit which includes a deposition step where a starting rod and a burner for production of glass particles are installed in a reactor, a glass source material is introduced into the burner, the glass source material is subjected to flame thermal decomposition in the flame formed by the burner to thereby form glass particles, and the formed glass particles are deposited on the starting rod to produce a glass particulate deposit, wherein:
in the deposition step, at least two ejecting ports are provided per one burner for ejecting the glass source material jetting out from the burner, the area of at least one ejecting port of those ejecting ports is $2.25 \times 10^{-4}$ or less of the area of the flame forming part of the burner, the glass source material is, in the form of a liquid thereof, supplied to each of the ejecting ports, gas jetting ports are arranged in such a manner that the inner periphery of the gas jetting port is positioned outside by 1.0 mm or less from the outer periphery of the liquid material ejecting port, and a gas is jetted out from the gas jetting port at a flow rate of more than 513 m/s.

2. The production method for a glass particulate deposit according to claim 1, wherein in the deposition step, five or more liquid material ejecting ports are provided per one burner.

3. The production method for a glass particulate deposit according to claim 1, wherein in the deposition step, the area of at least one ejecting port is $1.00 \times 10^{-4}$ or less of the area of the flame forming part of the burner.

4. The production method for a glass particulate deposit according to claim 1, wherein in the deposition step, the area of at least one ejecting port is $2.50 \times 10^{-5}$ or less of the area of the flame forming part.

5. The production method for a glass particulate deposit according to claim 1, wherein in the deposition step, the area of at least one ejecting port is $4.00 \times 10^{-6}$ or less of the area of the flame forming part.

6. The production method for a glass particulate deposit according to claim 1, wherein in the deposition step, a gas containing oxygen gas is jetted out through each gas jetting port to thereby atomize the glass source material jetting out through each ejecting port.

7. The production method for a glass particulate deposit according to claim 6, wherein in the deposition step, the gas is jetted out at a flow rate of 856 m/s or more through each gas jetting port to thereby atomize the glass source material jetting out through each liquid material ejecting port.

8. The production method for a glass particulate deposit according to claim 7, wherein in the deposition step, the number of the oxygen molecules contained in the gas jetted out through each gas jetting port is not less than the number of the Si atoms contained in the glass source material jetting out through each liquid material ejecting port.

9. The production method for a glass particulate deposit according to claim 7, wherein in the deposition step, the number of the oxygen molecules contained in the gas jetted out through each gas jetting port is at least 1.5 times the number of the Si atoms contained in the glass source material jetting out through each liquid material ejecting port.

10. The production method for a glass particulate deposit according to claim 6, wherein in the deposition step, the gas is jetted out at a flow rate of 1283 m/s or more through each gas jetting port to thereby atomize the glass source material jetting out through each liquid material ejecting port.

11. The production method for a glass particulate deposit according to claim 1, wherein in the deposition step, the glass source material to be supplied to the burner is siloxane.

12. The production method for a glass particulate deposit according to claim 1, wherein in the deposition step, the glass source material to be supplied to the burner is octamethylcyclotetrasiloxane (OMCTS).

13. A production method for a glass preform which includes a vitrification step where a glass particulate deposit is produced according to the production method for a glass particulate deposit of claim 1, and the thus-produced glass particulate deposit is heated to give a transparent glass preform.

14. The production method for a glass preform according to claim 13, wherein the deposition of the glass particles on the starting rod in the deposition step is implemented according to any of an OVD process, a VAD process or an MMD process.

* * * * *